June 24, 1952 E. G. SMITH ET AL 2,601,231
QUICK-ACTING DIAPHRAGM OPERATED GATE VALVE
Filed Feb. 13, 1948 2 SHEETS—SHEET 1
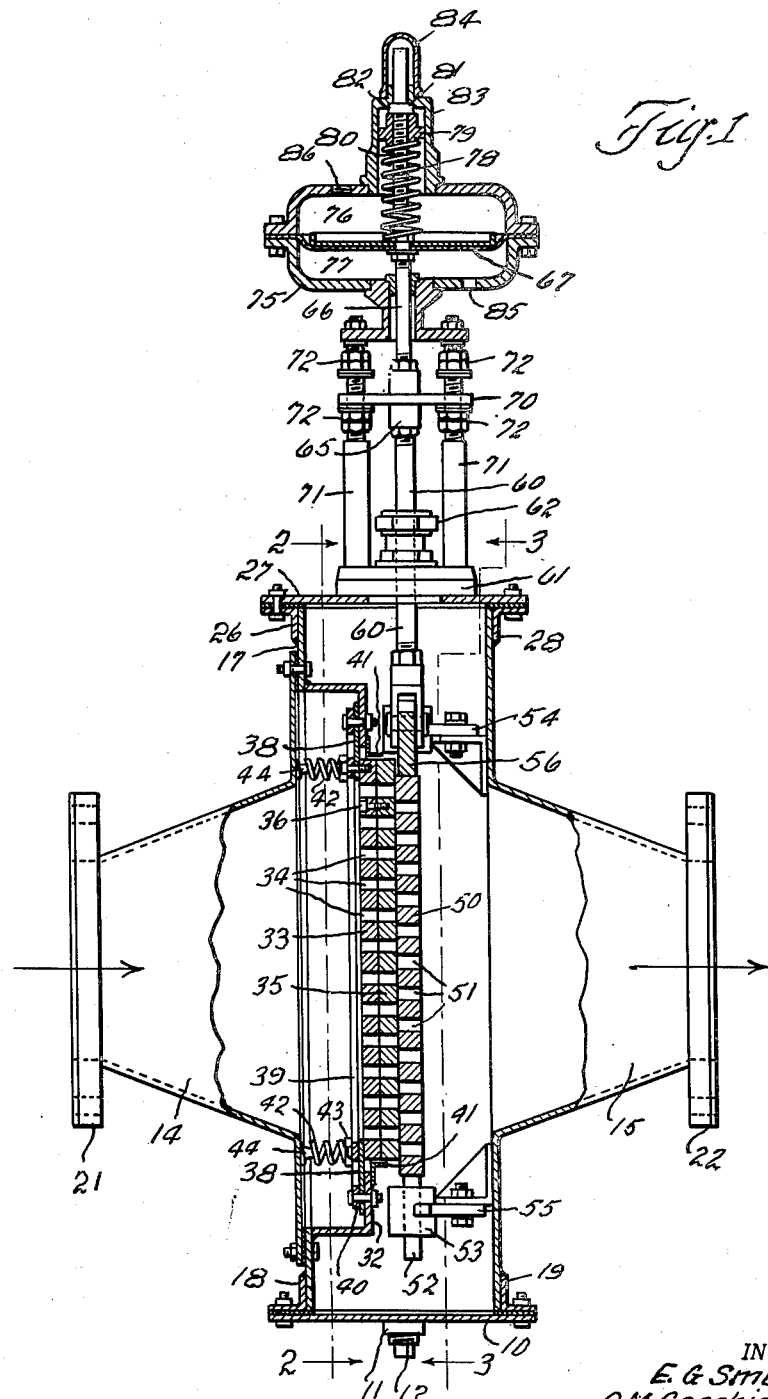
INVENTORS
E. G. Smith &
BY O. M. Cocchiarella
Atty.

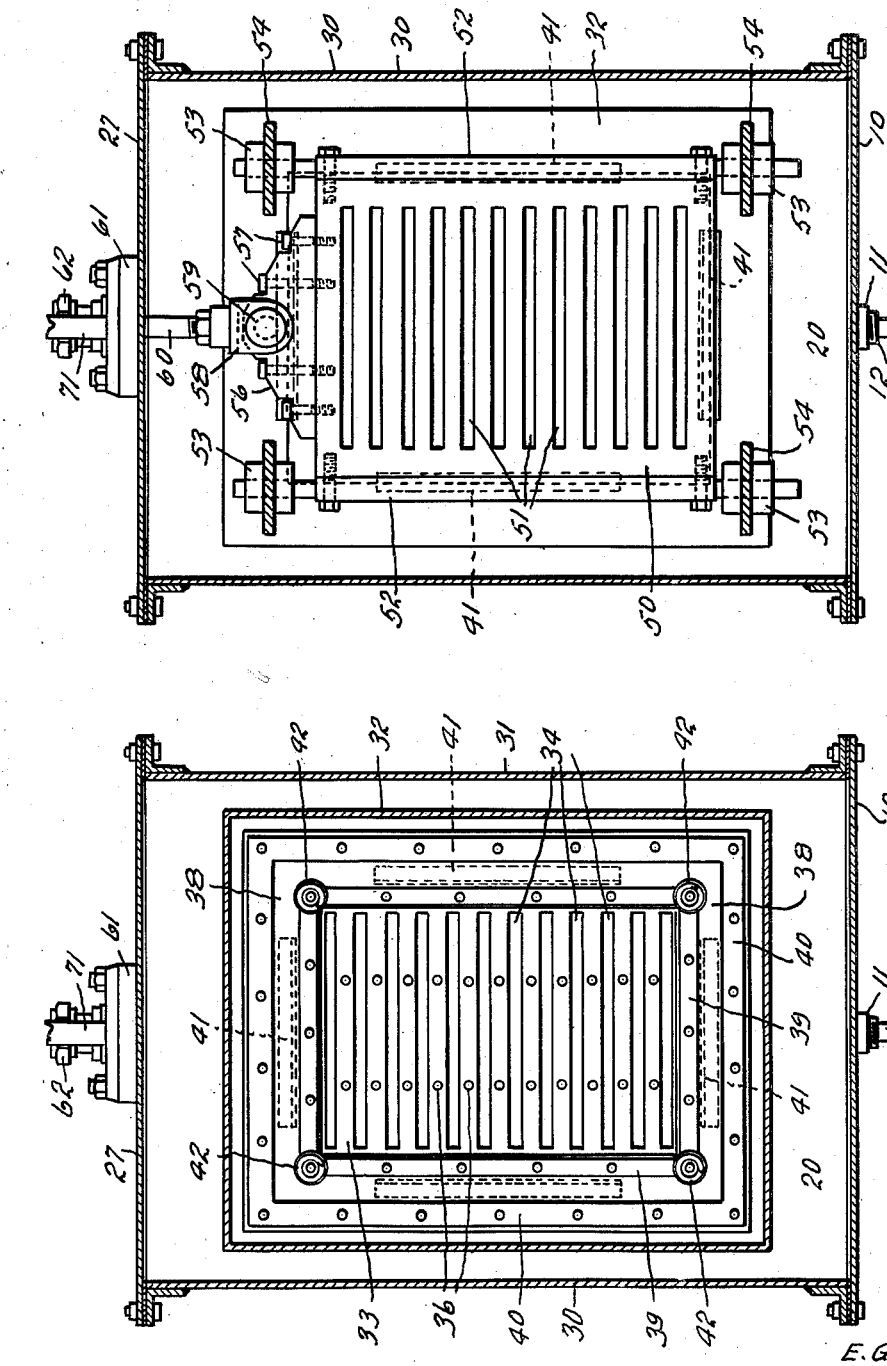

Patented June 24, 1952

2,601,231

UNITED STATES PATENT OFFICE 2,601,231

QUICK-ACTING DIAPHRAGM OPERATED GATE VALVE

Edmund G. Smith, Cedar Grove, and Otell M. Cocchiarella, Newark, N. J., assignors to Equipment Development Co., Inc., Montclair, N. J., a corporation of New Jersey Application February 13, 1948, Serial No. 8,146

1 Claim. (Cl. 251—51)

This invention relates to valves and more particularly to a quick-acting valve of a type suitable to control the flow of large quantities of liquid.

In valves having an opening of large area, the speed of operation is limited by the distance the moving part must travel between full open and full closed positions. This makes it difficult to time accurately the opening and closing, or the volume of liquid flow through the valve, as may be required in certain industrial operations. Also, it is impossible to start or stop the flow instantaneously.

An object of this invention is to provide a valve of the above type having an opening of large area and adapted to pass a substantial volume of fluid, which is capable of opening and closing substantially instantaneously.

Another object of the invention is to provide a valve of the above type in which the speed of operation is independent of the area of the valve opening.

Another object is to provide a large quick-acting valve having novel and improved details of construction and features of operation.

Various other objects and advantages will be apparent as the nature of the invention is more fully disclosed.

In accordance with the present invention, the valve is made up of a stationary valve plate and a slidable valve plate, each in the form of a grid having a plurality of elongated narrow openings therein which are arranged so that in the open position of the slidable grid the openings are in registration to provide a total open area equal to the sum of the areas of the various individual openings. The valve is closed by shifting the slidable grid to bring the openings therein out of registration with the openings in the stationary grid. The construction is such that a movement corresponding to only the width of the individual narrow openings is required in shifting the valve from fully open to fully closed positions.

In a preferred embodiment, the slidable grid is mounted to be actuated by a pressure controlled diaphragm having an area suited to develop the force required for actuating the slide. The stationary valve grid is mounted on a flexible support for limited free reciprocating movement toward and away from the slides so that it may be brought to bear tightly against the slidable grid. In this way the sliding friction is reduced without reducing the sealing properties of the two elements and the possibility of binding is eliminated.

Although the novel features which are characteristic of this invention are pointed out more particularly in the claim, the nature of the invention will be better understood by referring to the following description, taken in connection with the accompanying drawings, in which a specific embodiment of the invention has been set forth for purposes of illustration.

In the drawings:

Fig. 1 is a vertical longitudinal section through a valve embodying the present invention; and Figs. 2 and 3 are transverse sections taken on the lines 2—2 and 3—3 respectively of Fig. 1.

Referring to the drawings more in detail, the valve is shown as comprising a base or bottom plate 10, having a drain tap 11 closed by a plug 12 and supporting on one side an inlet housing 14 and on the other side an outlet housing 15. The inlet housing 14 is shown as attached to a bracket 17 which is secured to the bottom plate 10 by means of an angle iron 18. The outlet housing 15 is secured to the bottom plate 10 by means of an angle iron 19. The housings 14 and 15 are tapered from the valve chamber 20 and terminate in flanges 21 and 22 respectively which are adapted to be connected to inlet and outlet pipes for controlling the flow of fluid therethrough.

The bracket 17 is made in the form of a rectangle extending entirely around the valve chamber and at the top is secured by means of an angle iron 26 to a top plate 27. The top of the housing 15 is likewise secured to the top plate 27 by an angle iron 28. The sides of the valve chamber are closed by plates 30 and 31 (Figs. 2 and 3).

The bracket 17 is provided with a flange 32 having a rectangular opening in which a stationary valve plate 33 is positioned. The plate 33 is made in the form of a grid having a plurality of elongated, narrow, horizontal openings 34 spaced vertically therein. A face plate 35 having similar openings is attached to the stationary plate 33 by suitable means such as screws 36. The face plate 35 may be made of a plastic material such as Bakelite or Formica to prevent wear and scoring which might occur if the sliding parts were both made of metal.

The stationary plate 33 is supported from the flange 32 by means of a flexible diaphragm 38 which may be made of suitable material, such as rubber, and at its inner edge is clamped to the plate 33 by means of a rectangular clamping strip 39 and at its outer edge is clamped to the flange 32 by means of a similar clamping strip 40. The flange 32, diaphragm 38, and plate 33, form a complete closure across the valve chamber except for the openings 34. A plurality of angle strips 41, secured to the four sides of the flange 32 adjacent the stationary plate 33, provide stops to limit the movement thereof. The plate 33 is held in forward position by the pressure of the liquid and a plurality of springs 42 which are seated between clips 43 on the clamping strip 39 and bosses 44 formed on the housing 14.

A slide plate 50 is similar in shape and area to the stationary plate 33 and contains a plurality of elongated openings 51 which are adapted to register with the various openings 34 of the stationary plate 33 when the valve is in open position, and to be brought out of register with the openings 34 when the valve is in closed position. The slide plate 50 is attached at each side to a rod 52 which extends at its ends through stationary bearings 53 mounted on flanges 54 which are secured to the housing 15 by any suitable means, as by welding. The bearings 53 guide the slide 50 during its limited vertical movement.

At its upper end the slide 50 carries a bracket 56 which is secured thereto by bolts 57 and to which is pivoted a yoke 58 by means of a pin 59. The yoke 58 carries a valve rod 60 which extends upwardly through a plate 61 carrying a packing gland held by a follower 62 and is secured at its upper end to a coupling member 65. The coupling member 65 is in turn secured to a rod 66 which is attached to a pressure actuated diaphragm 67.

The coupling member 65 carries a cross arm 70 which is adapted to slide vertically on the threaded ends of a pair of rods 71 which are attached to the plate 61. A plurality of adjusting nuts 72 are mounted on the threaded ends of the rods 71 to provide adjustable stops to limit the movement of the valve rod 60 and the slide 50 in both directions.

The diaphragm 67 is held in a housing 75 which is attached to the upper ends of the rods 71 and is divided by the diaphragm 67 into a pair of chambers 76 and 77 respectively. The diaphragm 67 is held downwardly by means of a spring 78 which is seated between the diaphragm and a nut 79 which is threaded onto a pin 80. The pin 80 is provided with a flange 81 which bears against a shoulder 82 formed on a cap 83 which is secured to the housing 75. The nut 79 is keyed for vertical, but not rotational movement in the cap 83. The upper end of the pin 80 may be of a suitable shape to receive an adjusting tool. A closure 84 is removably secured to the cap 83 for enclosing the end of the pin 80. By suitable adjustment of the pin 80, the nut 79 is threaded longitudinally therealong so as to adjust the compression of the spring 78 and thereby control the operating characteristics of the valve. The pin 80 also serves as a stop to limit the upward movement of the diaphragm. The chamber 77 may be vented to the atmosphere by means of a vent 85 and the chamber 76 may be connected to a suitable source of sub-atmospheric pressure, or suction, by means of a pipe connected to a tapped hole 86 in the housing 75.

In the operation of this device it will be assumed that the valve is normally held closed with the slide 50 in its lower position, as shown in Fig. 1, by means of the weight of the sliding parts and the force exerted by the spring 78. In this position the stationary plate 33 is held firmly against the slide 50 by means of the springs 42 and by the pressure of the fluid against the face of the plate 33.

When it is desired to open the valve, suction is applied to the chamber 76 to cause the diaphragm 67 to deflect upwardly, thereby lifting the valve shaft 60 and the slide 50 until the arm 70 engages the upper stop nuts 72. The adjustment is such that in this position the elongated openings 51 in the slide 50 register with the elongated openings 34 in the stationary plate 33. The valve is thus brought into fully open position by a movement of the slide 50 corresponding only to the width of one of the openings 51.

The slide 50 is guided during its movement by the bearings 53. The spring mounting of the stationary plate 33 and the material of the face plate 35, however, prevent the slide 50 from binding due to material becoming wedged therebetween and reduce the friction to a minimum.

It will be noted that this action may be made practically a snap action provided the control diaphragm is made of sufficient area and the chamber 76 is connected to a source of suction which is capable of producing a rapid change in the pressure of the chamber. Likewise the valve closes with practically a snap action when the suction in the chamber 76 is released.

This valve is particularly adapted for use in the accurate control of the flow of a large quantity of liquid, as for example in the case of a thickener wherein a large controlled quantity of liquid must be fed to the filter medium at accurately timed intervals.

In accordance with the present invention, as soon as suction is applied to the chamber 76, the valve is immediately brought to full open position and a maximum flow of liquid takes place. The flow is immediately stopped as soon as the suction is cut off from the chamber 76. The slide 50 need only be shifted the slight amount necessary to close the individual openings 34. It will be noted accordingly that, by increasing the number of openings, the quantity of liquid controlled may be increased without changing the timing or operation of the valve. Hence, large quantities of liquid can be controlled as accurately as smaller quantities of liquid inasmuch as the amount of movement remains substantially the same regardless of the total flow for which the valve may be designed.

Obviously, the diaphragm may be actuated by positive pressure in the chamber 77 if desired, or the valve may be closed by applying positive pressure to the chamber 76. Other types of quick acting controls, electrical or mechanical, may also be used.

Although a specific embodiment of the invention has been shown for purposes of illustration, it is to be understood that various changes and adaptations may be made therein as will be readily apparent to a person skilled in the art. The invention is only to be restricted in accordance with the scope of the following claim.

What is claimed is:

A quick acting valve comprising a valve housing having inlet and outlet ports, a plastic seat plate extending across said housing to divide the same into inlet and outlet chambers, said plate being fixed against lateral movement in the plane of the plate and having a plurality of individual openings therethrough, a sliding valve plate mounted to slide over said seat plate and having openings registering with said first openings when in open position, said sliding plate being adapted to close said first openings when shifted to closed position, means to shift said sliding plate between open and closed positions, guide means arranged to hold said sliding plate against transverse displacement in a direction at right angles to its opening and closing movements, an annular flexible diaphragm secured around the outer peripheral margin of the seat plate and a fixed annular flange attached to the valve housing and secured to the outer periphery of said diaphragm beyond the edge of said seat plate, whereby said diaphrgam provides a seal and also permits limited reciprocatory movement of the seat plate toward and from said sliding plate.

EDMUND G. SMITH.
OTELL M. COCCHIARELLA.

REFERENCES CITED

The following references are of record in the file of this patent:

UNITED STATES PATENTS

| Number | Name | Date |
|---|---|---|
| 607,265 | McLean | July 12, 1898 |
| 1,016,573 | Maddox | Feb. 6, 1912 |
| 1,307,609 | Yarnall | June 24, 1919 |
| 1,488,296 | Stevens | Mar. 25, 1924 |
| 1,567,537 | Mockus | Dec. 29, 1925 |
| 1,727,677 | Siebert | Sept. 10, 1929 |
| 1,953,130 | Prellwitz | Apr. 3, 1934 |
| 2,246,092 | Gilman | June 17, 1941 |